United States Patent [19]
O'Donohue

[11] Patent Number: 5,651,318
[45] Date of Patent: Jul. 29, 1997

[54] STRADDLE AND UNDERWRAP NEBEL BEAM AND JIMMY ELECTROMAGNETIC TECHNOLOGY TRAIN PROTOTYPE MATING SYSTEM

[76] Inventor: James P. O'Donohue, 45 Christopher Dr., Unit #97, Suite #105, Methuen, Mass. 01844

[21] Appl. No.: 347,955

[22] Filed: Dec. 1, 1994

[51] Int. Cl.$^6$ .................................................. B60L 13/06
[52] U.S. Cl. ......................... 104/124; 104/281; 104/284
[58] Field of Search .................................. 104/281, 282, 104/284, 290, 291, 292, 118, 119, 124, 286, 294

[56] References Cited

U.S. PATENT DOCUMENTS

| | | | |
|---|---|---|---|
| 2,985,114 | 5/1961 | Lindner | 104/118 X |
| 3,198,139 | 8/1965 | Dark | 104/290 X |
| 3,225,228 | 12/1965 | Roshala | 104/290 X |
| 3,407,749 | 10/1968 | Frig | 104/282 |
| 4,646,651 | 3/1987 | Yamamura et al. | 104/281 |
| 4,903,610 | 2/1990 | Matsumoto et al. | 104/118 |
| 5,343,811 | 9/1994 | Schuster | 104/281 X |

*Primary Examiner*—S. Joseph Morano

[57] ABSTRACT

A monobeam/guideway (beam) and electromagnetically jimmied vehicle prototype mating system having: a beam of durable, long life pre-cast reinforced concrete or similar composite infrastructure produce with mass to reduce travel sound transmissions caused by deflections in lighter weight elevated guideway support designs. The beam to vehicle mating design allows the vehicle to straddle over the beam riding along its ridge on tires while balancing on support casters making firm positive contact at critical tangent points along the beam's Nebel surfaces during intermittent non-jimmied/non-levitated periods of operation. Non-jimmied vehicle positioning is free of the wide gap tolerances of prior art. The beam and elevated support allow the vehicle to underwrap and become jimmied by attractive magnetic response of magnetic balancers which are magnets at the vehicle underwrap excited by electromagnetic starter packs located underside guideway beams. The Beam has rubberized non-stick ride surfaces to shed ice and snow. Other magnetic balancers are also set at clockset positions to the beam's radial tendency and are in addition angular set in a unified saw-tooth arrangement to draw train toward travel direction. Noise, mechanical wear and the vibrational passenger discomforts of prior art during non-jimmied operation are reduced if not eliminated by this design.

24 Claims, 5 Drawing Sheets

STRADDLE AND UNDERWRAP NEBEL BEAM AND JIMMY ELECTROMAGNETIC TECHNOLOGY TRAIN PROTOTYPE MATING SYSTEM

DESCRIPTION

1. Field of the Invention

The invention relates generally to a beam designated to act as a guideway for its mated vehicle which together serve more particular as a Prototype design for an Attractive Force Electromagnetic Levitation Commuter Rail System.

2. Background of the Invention

Magnetic Levitation Commuter Rail Systems are designed for vehicle movement at such high speeds that freedom and safety from competitive vehicular, human or animal interference necessitate elevated track structures many of which are constructed of assembled steel fabrications using standardized components or are factory made pre-cast reinforced concrete units erected in the field. Commuter Rail vehicles are raised (i.e., "jimmied") into levitation and propelled by either repulsive magnetic force or attractive magnetic force. The term "jimmied" as used herein shall be synonymous with term levitated, and as such these terms may be used interchangeably. Magnets located on vehicles respond to the electrical field of starter packs/long stators located on guideways expressing electromagnetic reaction.

Should conductivity fail along the way the vehicle drops from its levitated position into mating position with their guideways where the vehicle must tolerate conditions of varied mating design tolerances between guideways and the vehicle attached motional assists such as rollers, tires or wheels connected to the vehicles making their non-levitated contact. These mating tolerances must be exaggerated from the ideal mechanical standards of most industries in order to provide for freedom of displacement enabling electromagnetic power to freely jimmy the vehicle into levitated position without binding. The greater the tolerance between the vehicle's motional assists and their point of tangent with the guideway, the more accelerated the wear of motional assists. A side effect of these exaggerated tolerances is decreased ride comfort due to increased capability of vibrational reaction causing passenger discomfort.

Additionally, although the vehicle may be in the magnetically levitated position, the guideways are still carrying their moving carriage and passenger loads with wind and gravitational forces acting upon them. Thereby, deflectional displacement can occur. In lighter weight guideway assemblies, the continuous sudden hammering down and springback of quick deflectional reactions over a period of time may lead to weakness in mechanical fastenings and fatigue at a rate accelerated to that of infrastructure of greater mass or component density. In addition, the deflectional whiplash can transmit unwanted sound which dense materials can resist and eliminate with greater capability. Magnetic Levitation vehicles travel at such high speeds that it has been found that when traveling through tunnels the air ahead of the train becomes compressed in front of the vehicle and the air behind is vacuumed in at such great power as to cause a side effect of tunnelsonic boom when vehicles finally exit a tunnel. Prior art systems would not wear well at lower tunnel taxi speeds as the tolerance problems have pointed out.

Several prior art systems shall now be discussed to more particularly discuss the problems of the prior art.

FIG. 2 illustrates a cross sectional view representing a lighter weight track assembly of two mutually parallel steel I-Beams 17 to steel angle fabrications whereby when the vehicle of this magnetic attraction system is in the non-jimmied position as shown, the rollers or wheels 18 ride upon a steel plate across the beam's 17 top flange and the leg of a steel angle 14 as shown and the tolerance gap is demonstrated by sideways lateral rollers 15 and the other leg of said steel angle 14. The freedom for lateral motion allows the vehicle to move laterally and with a degree of inhibited rotation with respect to the parallel direction of the assembly vehicle direction causing bounding vibration and shock in lateral directions wearing upon the assembly as well as hammering lateral rollers 15 with a grinding effect due to the contact of rollers or wheels 18, thereby having a problem with accelerated wear. This configuration is similar to the technology demonstrated in FIG. 3 of U.S. Pat. No. 5,094,172. In keeping with the ride assembly steel fabrication design of that system, the support system 16 for elevation of said ride assembly is presented as illustrate of braced erected steel assembly similar thereto.

FIG. 3 Shown in the nonjimmied position is a cross sectional view representing a T-shaped precast reinforced concrete monobeam guideway (T-Beam) 21 used in an attractive magnetic technology application. The exaggerated tolerances from the vehicle's lateral rollers 20 to side edge 19 of the T-cross of the beam 21 at both sides of the beam 21 allows for quicker wear. The broad flatness of the top ride surface 24 of the T-beam 21 can become an attraction to hydrostatic potential making the ride rollers or tires 23 glide out of control causing edge lateral rollers 20 to suffer additional stress and wear during inclement weather. In addition, the T-Beam's 21's cross shape is similar to a wing spread becoming more expensive and difficult to maintain at a non-freeze operating temperature because its sectional mass is reduced at the outer limits. This configuration is presented in similitude to the example guideway technology demonstrated in U.S. Pat. No. 3,804,022. For the structural elevation of the T-Beam guideway, the support column 22 is presented for illustration purposes as a squared edge, tapered trestle-column of reinforced concrete.

FIG. 4. Shown in non-jimmied position is a cross sectional view representing a W-shaped trough guideway 28 of ruse in synchronized applications of repulsive magnetic levitation systems. The vehicle's wheels 29 set down onto the guideway pavement surface 30. It is possible for wheels or rollers 26 to serve as landing gear being moved from free and tolerant position into tangent position with the W-trough's 28 center wall 25 as shown. Trough guideways 28 of this type of design may fill with precipitation. Whether or not designed for proper drainage, this guideway 28 becomes an expensive design to manufacture and the health results to passengers within the possible range of the dispersed magnetic field of repulsion technology are still unknown. This configuration is presented in similitude to the technology demonstrated in U.S. Pat. No. 3,890,906 commercially known as Hikari by Hitachi Limited of Japan. For structural elevation of the W-shaped trough guideway 28 the support column 27 is presented for illustration purposes as a torch shaped/top flared design broadening near the top and directing loads to a concentrated center trunk for bearing.

FIG. 5. Shown in non-jimmied position is a cross sectional view representing a V-shaped pipe reinforced steel fabricated monobeam guideway with a broad flat plate cap ride surface known also as a steel roadbed 35 having an angle leg 33 to each side for lateral roller 32 guidance. The system has been designed for use in attractive magnetic technology applications. The exaggerated tolerances from the vehicle's lateral rollers 32 to side edge angle leg 33 allows for quicker wear, even if the lateral rollers 32 become mechanically movable into tangency with angle legs 33. The broad flatness of the top 35 of the V-Beam's broad flat steel plate cap ride surface 35 can become an attraction to hydrostatic potential and in colder climates the combination of steel plate and supertrain wind chill factors are expected to conduct super ice layering upon the finished steel surface inhibiting the operation of rollers 31. Steel is unlike a concrete product which can contain a heated guideway element with better thermal resistance. This configuration is in similitude to the technology demonstrated in FIG. 1 of U.S. Pat. No. 4,696,235 commercially known as the Transrapid; it is a design born in the Federal Republic of Germany. For structural elevation of the V-Beam guideway, the support is given by a combined ornamental steel plate and precast concrete column assembly 34. The support illustration presents an example of this type of contemporary design.

SUMMARY OF THE INVENTION

Upon discovery of the various technical, economic, environmental, seasonal weather and longevity weaknesses of the prior art as discussed in the background of the invention, it became the objective of the inventor to overcome these weaknesses with a new prototype magnetic levitation commuter rail system which addresses all of the combined needs while offering exceptional benefit. Objective needs as outlined are:

1. Overcome the weakness in sloppy mating. A tightly mated vehicle to guideway response reduces vibrational wear-out and passenger discomfort, while improving safety by increasing the operational life of the vehicle and its motional assist accessories and guideway.
   (a) This is accomplished through positive placement whereby the vehicle undercarriage is designed for the support of casters as motional assists fitting into a nebel. The caster motional assists located within the nebel's top end region at final rise near to the edge of the beam's ride plateau ridge become closer to nebel contact in two directions as the vehicle disengages from the jimmied position until final mating replaces the jimmied position with tight tangent contact providing rendezvous guidance support to a bypassing outward body at the nebel's tread support while resisting lateral movement both at the upward swing of the nebel treads curvature and the said nebel's top end region final rise along the ride plateau of the beam.
2. Provide for balancing the lateral forces during jimmied position.
   (a) The side of the beam and the undercarriage skirts provide for this balancing through the use of the same electromagnetic attraction arrangement used to jimmy the train with the exception being that magnets on the vehicle's skirt are set angular to the beam so that as they are pulled upon they may become attracted in the direction of the train's travel. Starter packs located on the beam's skirt side are also set angular to the beam surface being parallel set with the train's magnet arrangement.
3. Maximize surface area of magnetic components to maximize potential high speeds.
   (a) The flat side of the beam and vehicle skirt arrangement as stated add to the surface area. The Nebel mounted magnetic components added will have starter packs mounted to fit the Nebel's mid-region angle while also positioned rotational to their axle polarization to face oncoming vehicle undercarriage Nebel mate magnets fixed to the same angular rotation, thereby pulling the train forward more than inward. It is known that to a measurable degree of response of less than 17% of the overall effort of this Nebel arrangement there will be a measured tendency to pull the vehicle downward at the same time as pulling it along the angles of which fixation will be set to maximize the forward vehicle movement tendencies to the greater degree while minimizing the downward pull tendencies. All electromagnetic forces will be synchronized to adjust and balance the vehicle with compensation expected to increase both speed and comfort. Angular mounts will be set to maximize efficiency.
4. Engage the design to take advantage of attractive electromagnetic technology.
   (a) The design follows the same principles for this as does the T-beam of prior art.
5. Incorporate exceptional durability and strength into the sectional configuration.
   (a) By having a singular unified section, strength is laminated by the closeness of supporting structural forces acting in continuous rotational defense. Further, the invention's beam is similar to three closely spaced beams with a connecting unified flange at the base, and a raftered (pitched sloped) bracing plate herein known as the Nebel from the top ride surface flange (ride ridge plateau) to the beam skirt side. This raftered bracing plate becomes useful incorporating contour to operate as the ride Nebel while adding to the stability of the overall section.
6. Provide for auxiliary vehicle movement especially through tunnels where lower speeds are preferred.
   (a) The design lends itself to the adoption of a live rail for standard energy transference. The said live rail can in this case become mounted on the center of the beam's ride ridge plateau between the rubber tire on wheel locations making contact during the desired non-jimmied vehicle operation periods.
7. Design an all-weather guideway.
   (a) The sectional configuration of the design provides for this consideration by being more concentric having top, bottom and sides working together more closely than a broad-winged design; thereby resisting total heat loss during freeze conditions while allowing dissipation as needed.
   (b) The molded rubber pad track lining intended to cover ride surfaces such as the beam's plateau, and Nebel ride areas along with the skid sides is to be a non-precipitous-stick surfacing material fastened into place by the aid of the starter pack mounting hardware. The Nebel pads at the tread will have drainage designed into them.
   (c) The narrowness of the plateau and the slope of the nebel provide for dispersion of the melting snow, ice and rain away from the beam.

Resulting from the summarized Specification Design Requirements, the Beam Invention allows the vehicle to straddle over the beam and underwrap it, thereby locking the vehicle onto the beam while being supported with full and tangent contact with the nebel. The nebel shape is the keyway of contour, allowing the train by gravity to rest into positive placement and continue moving along during non-jimmied intermittent motive and non-levitation emergencies without the sloppy side effects of tolerances required for the freedom of displacement during the Jimmy switch to flotation operation, which occurs when the vehicle is jimmied by the use of Electromagnetic Technology. When the train lowers into non-jimmied position, it fits into the nebel/ contour support equally on both sides which provide vertical balance at angular position, offering additional horizontal ride support at the same time. The spread allows lifting away from the outward vertical angular support without having to unlock wheels from the sides as would be required if conventional rectangular Monorail Technology were used. The angular set magnets and starter packs in their respective unities follow a saw-tooth pattern of arrangement providing for the energy used to serve forward pull to a greater degree than had they been simply flush mounted.

BRIEF DESCRIPTION OF THE DRAWINGS

The above and further advantages of the invention may be better understood by referring to the following description in conjunction with the accompanying drawings in which.

DESCRIPTION OF A PREFERRED EMBODIMENT

Figure 1:
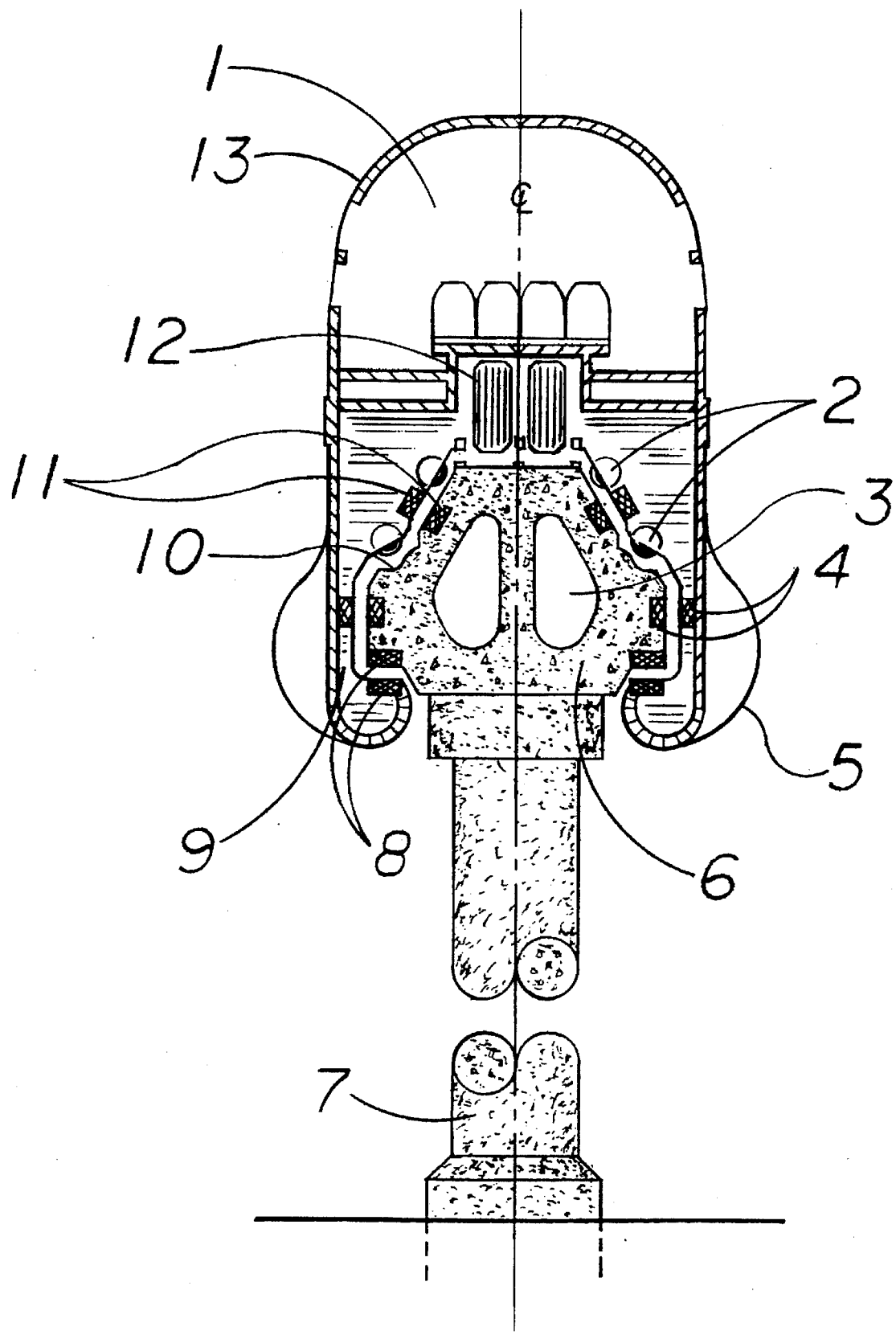
FIG. 1 is a sectional view through the Straddle and Underwrap Nebel Beam and the Jimmy Electromagnetic Technology Train System (Invention) in the Jimmied position showing the undercarriage, exterior, and interior cab contour outlines and the ride (motional assists) and lift mechanisms as they relate to the mating beam (guideway). Shown as an example in elevation drawing is a typical beam elevated support column.
Figure 2:
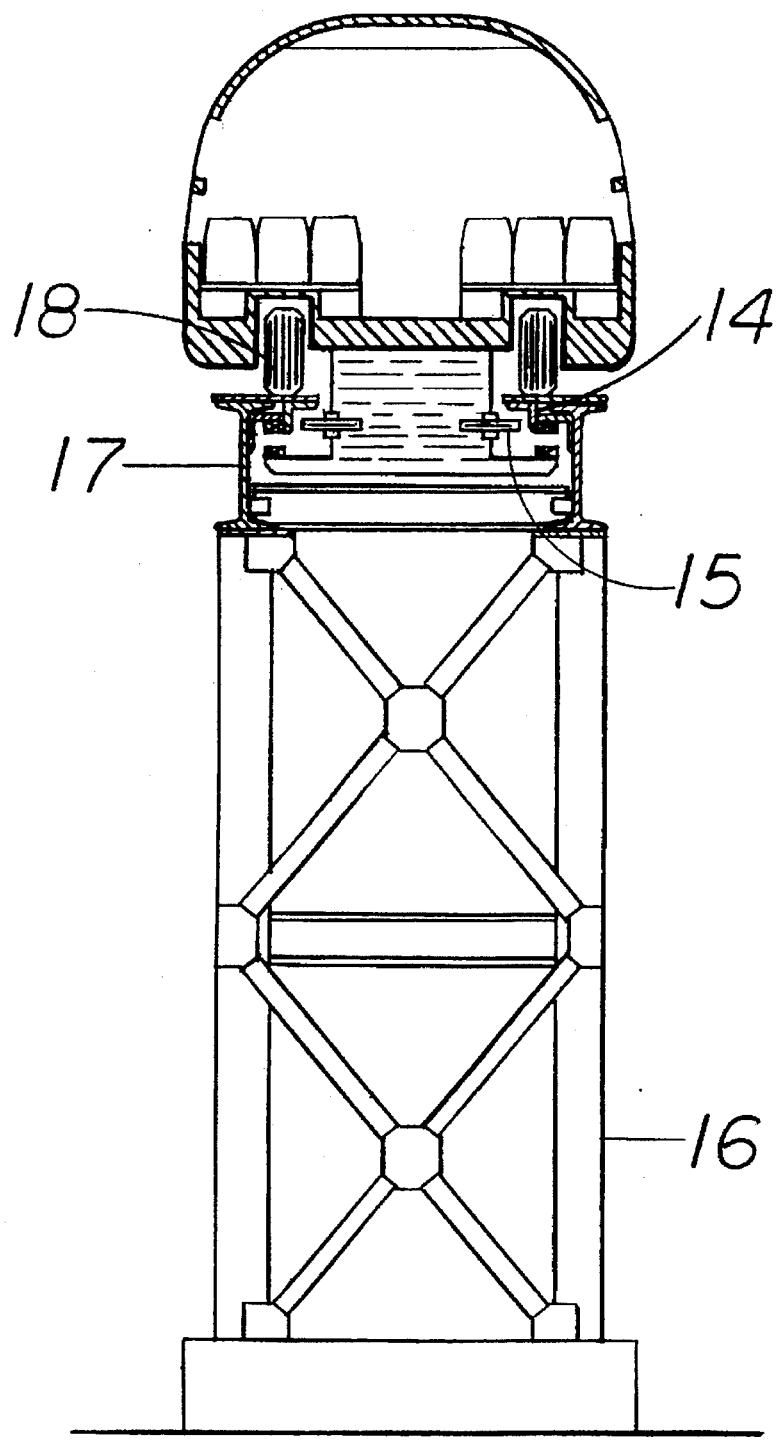
FIG. 2 is a sectional view through a prior art erected steel fabrication track with vehicle in the non-jimmied position showing undercarriage, exterior, and interior cab outlines and ride mechanisms (motional assists) as they relate to guidance along the assembly. Shown in elevation drawing is an example of a possible assembly elevation support system of likeness with the assembly.
Figure 3:
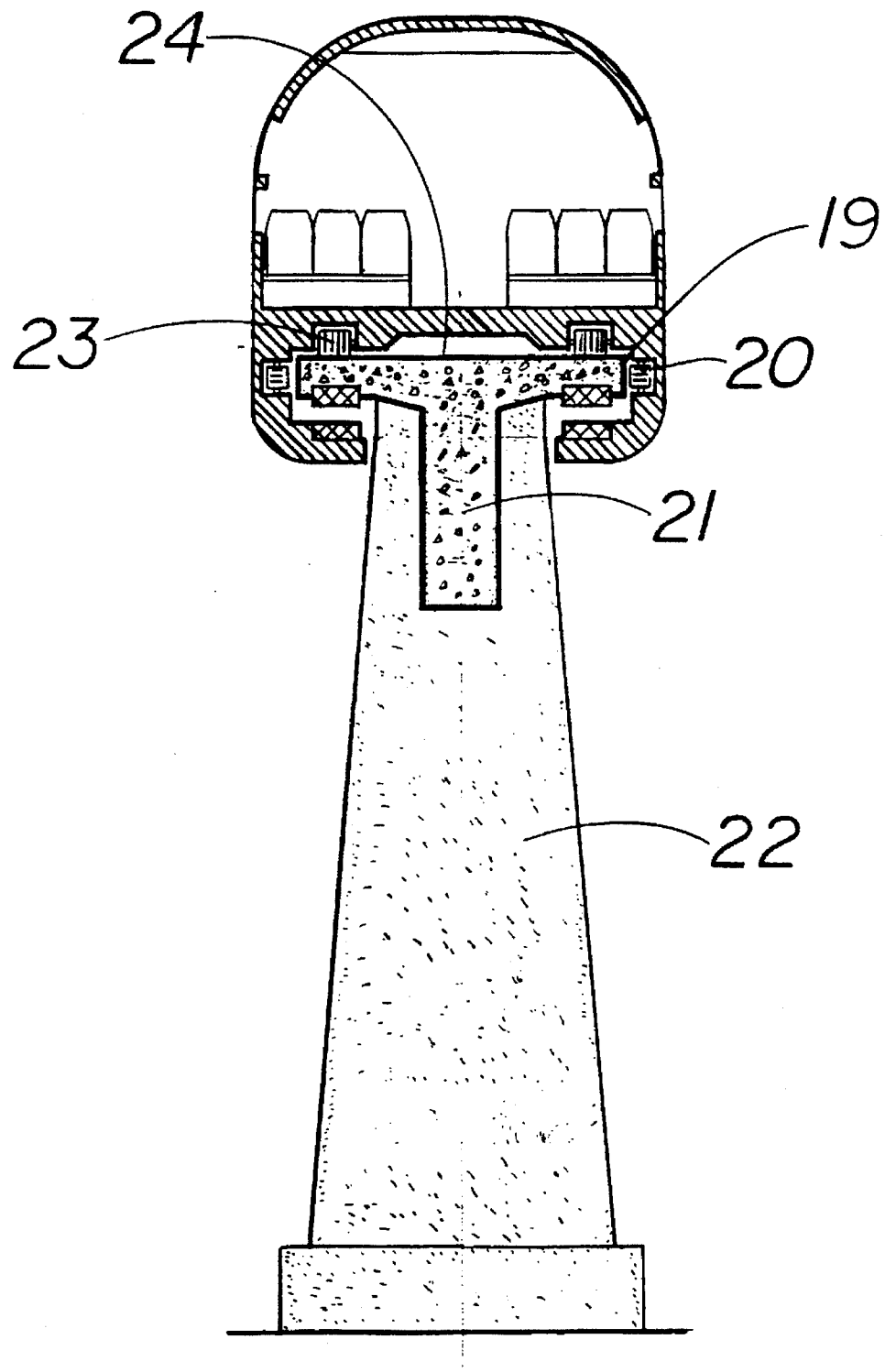
FIG. 3 is a sectional view through a prior art reinforced concrete guideway with vehicle in the non-jimmied position showing undercarriage, exterior, and interior cab outlines and ride mechanisms (motional assists) as they relate to guidance along the guideway. Shown in elevation drawing is an example of a possible guideway elevation support column of a type adapted by design for such use.
Figure 4:
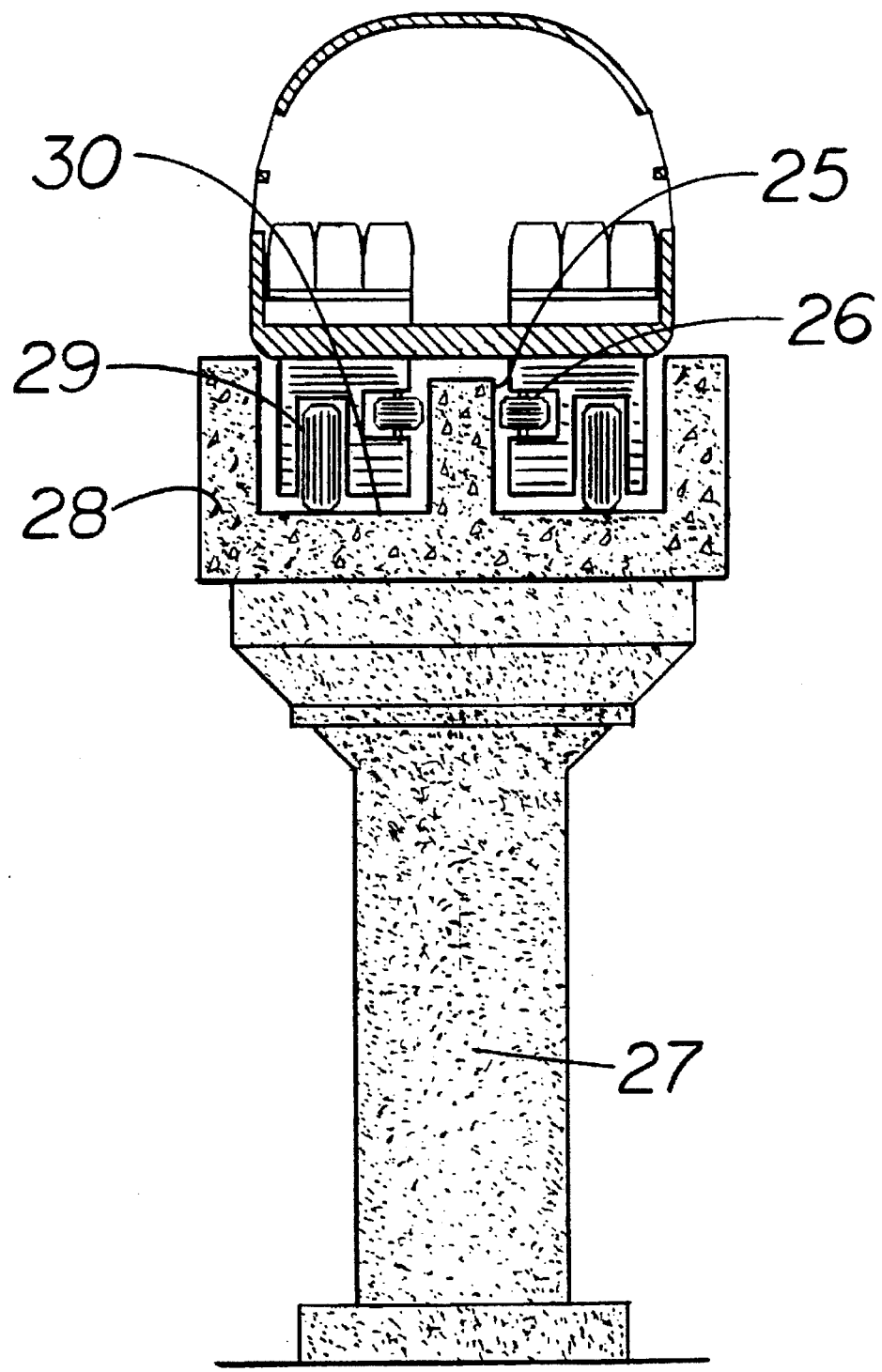
FIG. 4 is a sectional view through a prior art reinforced concrete guideway with vehicle in the non-jimmied position showing undercarriage, exterior, and interior cab outlines and ride mechanisms (motional assists) as they relate to guidance within the guideway. Shown in elevation drawing is an example of a possible guideway elevation column design.
Figure 5:
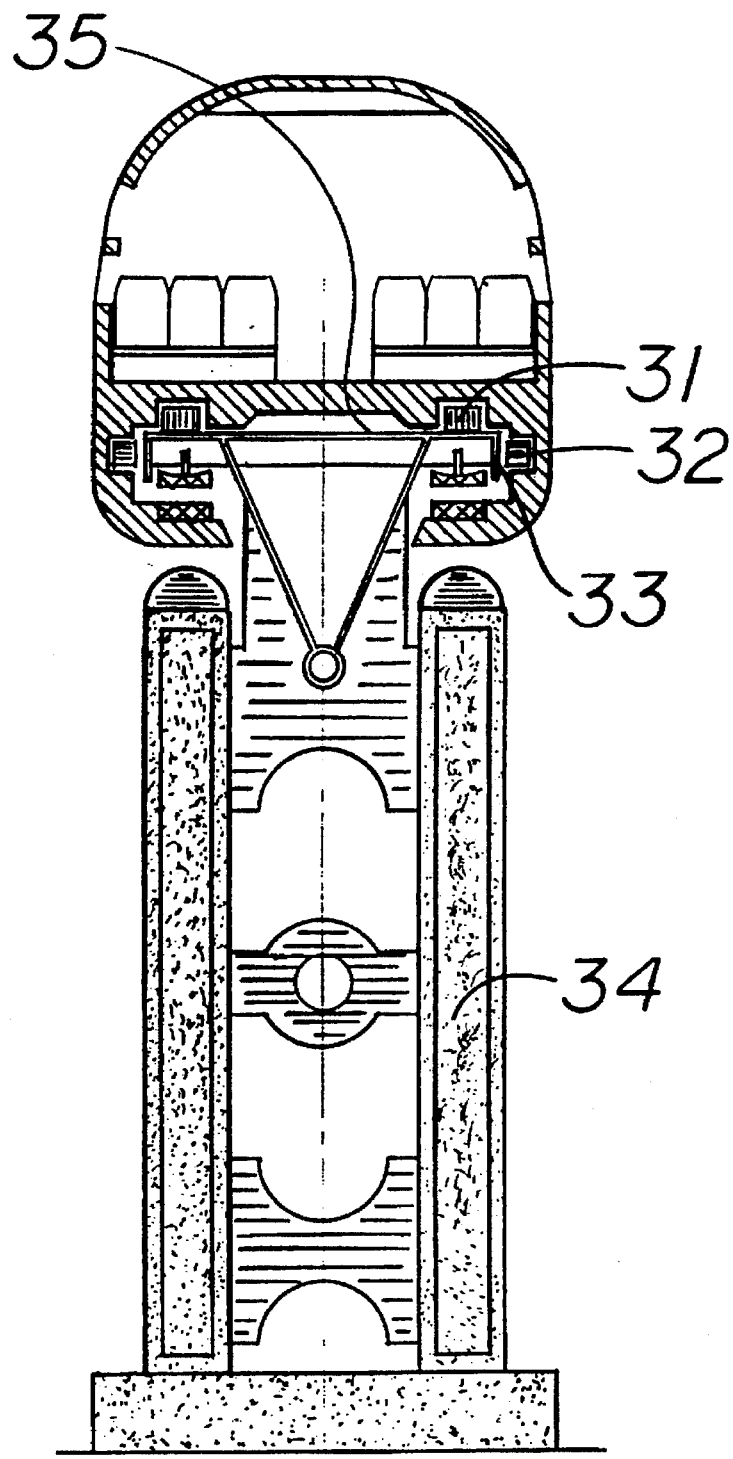
FIG. 5 is a sectional view through a prior art steel fabricated assembly guideway with vehicle in the non-jimmied position showing undercarriage, exterior, and interior cab outlines and ride mechanisms (motional assists) as they relate to guidance along the guideway. Shown in elevation drawing is an example of a guideway elevation support system shown fabricated similar in design to the actual support system presented in the prior art's modeling.

As can be seen in FIG. 1, the Straddle and Underwrap Nebel Beam and Jimmy Electromagnetic Technology Train Prototype Mating System is descriptive of the design occupation of the beam 6 in providing for performance of its partner train as outlined by the vehicle's body 13 and 5 to Straddle over and Underwrap the beam 6 while being supported in the beam's Nebel at the tread (i.e., a trough) 10 by caster bearings 2 during non-levitated operation. In this cross sectional view, the vehicle (train) is shown in the jimmied position.

The vehicle arrives at the jimmied position when the Magnetic Balancers 8 which are magnets 8 on the train and starter packs 8 on the beam 6 Jimmy the train, pulling the train's underwrap upward by attraction toward the bottom of the beam 6 while propelling the train forward utilizing Electromagnetic Technology.

The word Nebel is multi-descriptive. Nebel is Hebrew in origin, and means triangular or sloped and also contour. It is also found in reference to the nose which is a triangle of sorts in contour. An ancient Hebrew harp which was both of basic triangular shape and curved or contoured was known as the Nebel. This beam's overall sectional shape is that of a Nebel, but in reference to the Nebel areas of the beam the Nebel is further defined.

The term "Nebel" (e.g., a shoulder) shall be defined herein as the shape of the area extending from the edge of the ridge ride plateau where taxi wheels 12 (shown with rubber tires) operate during non-jimmied periods of operation, to the flat vertical sides of the beam which in this case are called the skirt sides, as shown in FIG. 1.

The dual Nebel areas (sloped contoured beam sides) along with the ride ridge plateau act as a keyway which lock the train into gravitational and lateral guidance support during non-jimmied operation and allow the train to unlock and release during Jimmy. The Nebel area nearest the ridge is called the rise and provides by the upper caster bearing 2 the greatest resistance to lateral movement during non-jimmied operation. The Nebel area nearest the skirt side has an indentation contour known as the tread 10. In the tread 10 of the Nebel the caster bearing 2 assists its partner caster bearing 2 of the rise in resistance to lateral movement while also assisting the taxi wheels 12 in balancing the train and moving it along providing gravitational support.

The taxi wheels 12 can be powered to move the train along during taxi speeds where desired, either by regulated lower volume electromagnetic power or by auxiliary power. The taxi wheels 12 are spaced to allow for the addition of a backup auxiliary power rail to be installed at the beam's 6's center of the ride ridge plateau.

The Skirt of the Train is considered to be a portion of the body 13 as it relates to the undercarriage area set below the floor level of the passenger cab interior 1 and includes the section of the undercarriage's reinforcement plate truss 9 where it bypasses the flat vertical side of the beam 6 known as the skirt side. Here at the skirt of the vehicle body 13, reinforcement plate truss 9 and beam 6 are located additional magnetic balancers known as the skirt magnetic balancers 4 which are different from the magnetic balancers 8 in that they are set in place angular to the train and beam while maintaining a parallel relationship. As skirt magnetic balancers 4 (being magnets) on the train are pulled upon by skirt magnetic balancers 4 (being starter packs) on the beam 6 the results of excitation in set angle arrangement are favorable to the trains forward travel by both current and unified saw-tooth angle arrangement.

The Nebels of the Beam 6 and the Trains contoured mating undercarriage areas also have mounted magnetic components. These are magnetic balances 11, known herein as the Nebel balancers 11. The Nebel balancers 11 on the train are magnets 11 and the Nebel balancers on beam 6 are starter packs 11. The Nebel balancers 11 are located at the mid region of the Nebel's angular slope between caster bearings 2, where caster bearings 2 will become tangent with beam 6 during non-jimmied operation. The Nebel balancers 11 mounted on the beam 6 not only follow the angle of the Nebel but also are set angular mounted to a degree of perpendicular rotation from the angled surface of the beam's 6 longitudinal direction. Therefore, to the degree that the Nebel is designed to favor vertical direction as opposed to horizontal, the attraction of Nebel balancers 11 will not infringe upon the operation of magnetic balancers 8 and magnetic balancers 4.

The crossing force area of magnetic reaction by magnetic balancers 4 will assist magnetic balancers 8 in synchronizing and offsetting the minimal percentage of downward pulling forces created by the Nebel balancers 11 operating mostly vertical. Thus, downward pulling forces of magnetic balancers 11 transfer mostly into inward vertical, and forward pull, providing more balance while increasing the propelling efficiency of magnetic surface area per linear foot of beam 6 and thus potential speed. In addition to the vertical favoring of the Nebel balancers 11, the beam 6 mounted Nebel balancers 11 are also set as above said to a degree of perpendicular rotation from the angled surface this angular setting will favor forward pull of the train the same way as magnetic balancers 4 are designed to operate. Thus, favorability of forward and vertical pull by Nebel balancers 11 will far outweigh the anti-jimmy forces created by their lesser degree of downward pull.

By having six locations for mounting magnetic balancers, the magnetic reaction surface area is increased. Thus, as above said potential speed becomes increased by having a carrier (the beam 6) sectionally round as to offer dual pull at a spanned 6 o'clock (the beam 6 bottom side serving train underwrap), 3 and 9 o'clock (the vertical skirt sides), and 2 and 11 o'clock (the nebel area set favorable to the vertical); the balancing and synchronization of forces will be enabled to provide for a smoother and more forceful ride. The lesser but measurable degree of anti-jimmy force of Nebel balancers 11 leaning slightly toward 12 o'clock noon (the beam's 6's uppermost horizontal and train's downward bearing surface area known as the ride ridge plateau) will assist the train's course maintenance monitor system by providing a degree of hold-down anti-jimmy aid. The train will thus hug in Jimmy position to the guideway's aura in an all-around suspended state of flotation while fixed to the clock settings of magnetic balancers 4, 8 and 11 as designed. By spreading the burden of the work (moving the combined train passenger loads) around to the most selective of clock set positions, it is expected that the work divided by the strategically placed forces of the magnetic balancers 4, 8 and 11 employed will result in greater distance per hour for the quantitative work involved thus acting to relieve force focused stress in the area of long stator generated static pressure heat.

The undercarriage design will provide the undertrain with a downward wingspread which will have increased airflow undersurface area as opposed to a design being governed solely by the train's dimensional width. This undercarriage area will have a contour following the fit required to the mating Nebel during non-jimmied operation. This mating undercarriage contour's enclosing shell will be of lightweight aeronautical materials, and will be supported by the reinforcement plate truss 9. The outline of an alternative body contour 5 will provide additional strength to the skirts and the foot magnets which are magnetic balancers 8 by extending outward the breadth of reinforcement plate truss 9 at the base of the train if implemented. Alternative body contour 5 will also provide the train with additional aerodynamic design considerations and could house a skirt to beam 6 emergency braking system, or provide the lead car with a wider initial air intake or the caboose with a wider exhaust air escape or house undercarriage control air flow devices.

The hollows/nostrils 3 of the beam 6 will act as cable ducts 3 with built-in troffing to conduit information superhighway cable trunks linking cities to breath telecommunications, voice and image data information back and forth free of congestion while hiding protected inside the beam 6. Governments may earn revenues by leasing nostril 3 space inside the infrastructure beams 6 to the telecommunications companies thus offsetting the Transportation system's cost through increased revenues. The telecommunications industry will have an enclosed protected space without having to set up poles or excavate, install and bury conduits for main utility trunks beneath the ground, nor pay for the rights and legal costs of obtaining easements to cross properties for the purpose of interlinking major cities and industry branches along a route. Thus, a cost-effective formula may be worked out for leasing the beam's hollows 3. Utilization enhances the system design as a dual or multipurpose infrastructure carrier lending itself to moving both people and information. The increasingly wireless world will create an increasingly crowded orbit space for satellites, causing a need for reliable backup routes along the information superhighway through ground carriers such as can be placed within these beams 6.

The beams 6 can be elevated by reinforced concrete support columns 7.

The passenger cab interior 1 will be housed by the vehicle body 13. The vehicle body 13 will be of lightweight aeronautical materials. The passenger cab interior 1 will have group seating arranged in the center of the car at locations where the taxi wheels 12 are located similar to Alweg Monorail Technology placement, with other seating in areas along a center aisle.

Although the present invention has been shown and described with respect to a preferred embodiment thereof, it should be understood by those skilled in the art that various other changes, omissions and additions to the form and detail thereof, may be made therein without departing from the spirit and scope of the invention.

What is claimed is:

1. A rail assembly for a magnetically levitated train, comprising:
   a horizontal ride ridge surface;
   a rail assembly base;
   two outwardly and upwardly sloping exterior sidewalls extending from said rail assembly base;
   outwardly extending horizontal sidewalls each connected to an associated one of said outwardly and upwardly sloping exterior sidewalls, wherein each of said horizontal sidewalls extends outward in a direction perpendicular to a vertical center line of the rail assembly;
   two exterior vertical sidewalls which each extend vertically upward from an associated one of said outwardly extending horizontal sidewalls; and
   two inwardly sloping exterior sidewalls which each connect with an associated one of said vertical sidewalls and extend upward from said vertical sidewalls and connect with said horizontal ride ridge surface.

2. The rail assembly of claim 1 wherein said outwardly extending horizontal sidewalls each include magnetic balancers which assist in the levitation of the train.

3. The rail assembly of claim 2 wherein said vertical sidewalls include skirt magnetic balancers mounted in said side vertical walls to assist in the propulsion of the train.

4. The rail assembly of claim 3 wherein said inwardly sloping sidewalls include a trough adapted to receive a caster bearing from the train undercarriage when the train is in a non-levitated position for guiding the train on the rail assembly.

5. The rail assembly of claim 4 wherein the rail assembly is positioned atop a support column to elevate the assembly above the surface.

6. The rail assembly of claim 5 wherein said inwardly sloping exterior sidewalls each include magnetic balancers placed within said inwardly sloping side walls, and which conduct magnetic flux in a controlled manner to assist in propelling the train.

7. The rail assembly of claim 6, wherein said horizontal ride ridge surface includes an auxiliary power rail which conducts electrical power to the train.

8. An electromagnetic train mating structure, comprising:
  A) a rail assembly which includes a
    1) a horizontal ride ridge surface;
    2) a rail assembly base;
    3) two exterior vertical sidewalls which each extend vertically upward from said rail assembly base;
    4) two inwardly sloping exterior sidewalls which each mount with an associated one of said vertical sidewalls and extend upward from said vertical sidewalls and connect with said horizontal ride ridge surface; and
  B) a contoured rail mating underbody structure for a magnetically levitated train, which straddles said exterior vertical sidewalls and said inwardly sloping exterior sidewalls and underwraps said rail assembly base.

9. The electromagnetic train mating structure of claim 8 wherein said contoured rail mating underbody structure comprises
  1) at least one taxi wheel which rides atop said horizontal ride ridge surface when the train is not in the levitated position;
  2) sloping underbody sidewalls which extend downward and outward from said taxi wheel, wherein said sloping underbody sidewalls are positioned adjacent to and in operative magnetic relationship with said inwardly sloping exterior sidewalls of said rail assembly, such that, said sloping underbody sidewalls straddle said inwardly sloping exterior sidewalls;
  3) vertically extending underbody sidewalls which run downward from said sloping underbody sidewalls and are adjacent to said exterior vertical side walls; and
  4) two inwardly extending horizontal underbody surfaces, each of which underwraps a portion of said rail assembly base, wherein said inwardly extending horizontal underbody surfaces each include a magnetic balancer which conducts flux in a controlled manner with a mating magnet within said rail assembly base to generate a vertically oriented electromotive force which acts to levitate the train from said rail assembly.

10. The electromagnetic train mating structure of claim 9 wherein said outwardly sloping underbody sidewalls each include a caster bearing which contacts said inwardly sloping exterior sidewalls to guide the train when the train is not in the levitated position.

11. The electromagnetic train mating structure of claim 10 wherein said vertically extending underbody sidewalls each include a first skirt magnetic balancer, and said exterior vertical sidewalls each includes a second skirt magnetic balancer, wherein said first and second skirt magnetic balancers are controlled in such a manner that they together generate an electromotive force which propels the train in a straddled levitated position.

12. The electromagnetic train mating structure of claim 11 wherein said outwardly sloping underbody sidewalls each include underbody magnetic balancers mounted within said sidewalls, and which are positioned in operative magnetic relationship to rail magnetic balancers mounted within said inwardly sloping exterior sidewalls, wherein said underbody magnetic balancers and said rail magnetic balancers are controlled to assist in propelling the train.

13. An electromagnetic train mating structure, comprising:
  A) a rail assembly which includes a
    1) a horizontal ride ridge surface;
    2) a rail assembly base;
    3) two outwardly and upwardly sloping exterior sidewalls extending from said rail assembly base;
    4) outwardly extending horizontal sidewalls each connected to an associated one of said outwardly and upwardly sloping exterior sidewalls wherein each of said horizontal sidewalls extends outward in a direction perpendicular to a vertical center line of the rail assembly;
    5) two exterior vertical sidewalls which each extend vertically upward from an associated one of said outwardly extending horizontal side walls;
    6) two inwardly sloping exterior sidewalls which each mount with an associated one of said vertical sidewalls and extend upward from said vertical sidewalls and connect with said horizontal ride ridge surface; and
  B) a contoured rail mating underbody structure for a magnetically levitated train, which straddles said outwardly extending horizontal sidewalls and said inwardly sloping exterior sidewalls and underwraps said outwardly extending horizontal side walls.

14. The electromagnetic train mating structure of claim 13 wherein said contoured rail mating underbody structure comprises
  1) at least one taxi wheel which rides atop said horizontal ride ridge surface when the train is not in the levitated position;
  2) sloping underbody sidewalls which extend downward and outward from said taxi wheel, wherein said sloping underbody sidewalls are positioned adjacent to and in operative magnetic relationship to said inwardly sloping exterior sidewalls of said rail assembly, such that, said sloping underbody sidewalls straddle said rail assembly;
  3) vertically extending underbody sidewalls which run downward from said sloping underbody sidewalls and are adjacent to said exterior vertical side walls; and
  4) two inwardly extending horizontal underbody surfaces, each of which underwraps an associated one of said outwardly extending horizontal sidewalls, wherein said inwardly extending horizontal underbody surfaces each include a magnetic balancer which conducts flux in a controlled manner with a mating magnet within said outwardly extending horizontal sidewalls to generate a vertically oriented electromotive force which acts to levitate the train from said rail mating structure.

15. The electromagnetic train mating structure of claim 14 wherein said outwardly sloping underbody sidewalls each include a caster bearing which contacts said inwardly sloping exterior sidewalls when the train is not in the levitated position.

16. The electromagnetic train mating structure of claim 15 wherein said vertically extending underbody sidewalls each include a first skirt magnetic balancer and said inwardly sloping exterior sidewalls each includes a second skirt magnetic balancer, wherein said first and second skirt magnetic balancers are controlled in such a manner that they together generate an electromotive force which propels the train in a straddled levitated position along said rail mating structure.

17. The electromagnetic train mating structure of claim 16 wherein said outwardly sloping underbody sidewalls each include underbody magnetic balancers mounted within said outwardly sloping underbody sidewalls, and which are positioned in operative magnetic relationship to rail magnetic balancers mounted within said inwardly sloping exterior sidewalls, wherein said underbody magnetic balancers and said rail magnetic balancers are controlled to assist in propelling the train.

18. The electromagnetic train mating structure of claim 17 wherein said horizontal ride ridge surface includes an auxiliary power rail which conducts electrical power to the train, and said rail assembly is constructed of precast reinforced concrete.

19. A rail assembly for a magnetically levitated train having an undercarriage which straddles and underwraps the rail assembly, comprising:

a horizontal ride ridge surface;

a rail assembly base;

a pair of inwardly sloping exterior sidewalls which slope inward and upward from said rail base assembly to said horizontal ride ridge surface, said rail assembly adapted to have the train undercarriage straddle said pair of inwardly sloping exterior sidewalls and underwrap said rail assembly base;

at least one magnetic balancer located on at least one of said inwardly sloping sidewalls for propulsion of the train; and at least one trough located on at least one of said inwardly sloping sidewalls adapted to receive a caster bearing from the train undercarriage when the train is in a non-levitated position so as to guide the train on the rail assembly.

20. The rail assembly of claim 19, wherein said at least one magnetic balancer is placed within each of said inwardly sloping sidewalls, and which conduct flux in a controlled manner for assisting in propelling the train.

21. The rail assembly of claim 19, wherein said rail assembly base comprises magnetic balancers adapted to magnetically interact with associated magnetic balancers within the train undercarriage for generating a vertically oriented electromotive force which places the train in a levitated position.

22. A rail assembly for a magnetically levitated train, comprising:

a horizontal ride ridge surface;

a rail assembly base;

two exterior vertical sidewalls which each extend vertically upward from said rail assembly base;

two inwardly sloping exterior sidewalls which each connect with an associated one of said vertical sidewalls and extend upward and inward from said vertical sidewalls and connect with said horizontal ride ridge surface;

at least one skirt magnetic balancer located on each of said vertical sidewalls for assisting in propelling the train; and at least one trough located on at least one of said inwardly sloping sidewalls adapted to receive a caster bearing from the train undercarriage when the train is in a non-levitated position so as to guide the train on the rail assembly.

23. The rail assembly of claim 22 wherein said at least one skirt magnetic balancer is mounted within each of said vertical sidewalls.

24. The rail assembly of claim 22, wherein said inwardly sloping exterior sidewalls each include at least one magnetic balancer placed therein which conduct flux in a controlled manner for assisting in propelling the train.

* * * * *